Feb. 17, 1970  G. KINDEL  3,495,858
UNIVERSAL JOINT CONSTRUCTION
Filed May 27, 1968
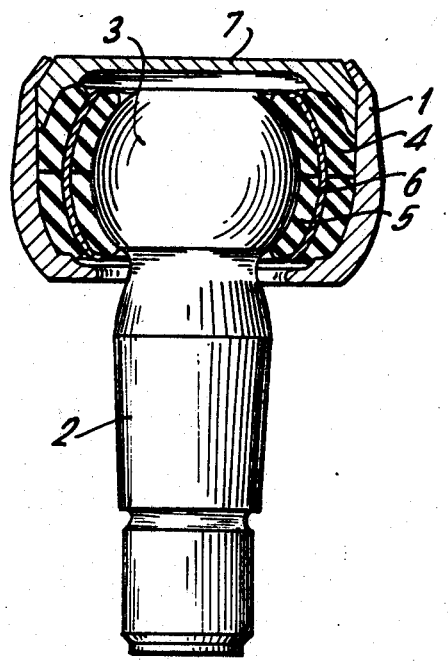
INVENTOR.
GEORG KINDEL
BY
*McGlew & Toren*
ATTORNEYS United States Patent Office 3,495,858
Patented Feb. 17, 1970

3,495,858
UNIVERSAL JOINT CONSTRUCTION
Georg Kindel, Lemforde, Hann, Germany, assignor to Lemforder Metallwaren AG, Lemforde, Hann, Germany
Filed May 27, 1968, Ser. No. 732,428
Claims priority, application Germany, June 2, 1967,
L 56,646
Int. Cl. F16b 7/00; F16c 11/06
U.S. Cl. 287—87          2 Claims

ABSTRACT OF THE DISCLOSURE

A hinge connection, particularly, a ball and socket joint for the connection of swinging parts of motor vehicles, comprises a hinge pin having a ball socket which is supported for universal pivotal movement in a joint housing which is lined with a plurality of pre-stressed elastic inserts of generally spherical configuration. The relative movements of the joint parts are absorbed by molecular deformation of the elastic inserts. The elastic inserts comprise rubber or rubber-like material formed of several telescopic layers having shells of firm material interposed between the layers. The complete construction includes a flange cover which closes the end of the housing opposite to the end through which the hinge pin extends.

Summary of the invention

This invention relates in general to the construction of universal joints and, in particular, to a new and useful universal joint including a hinge pin having a ball formation which is supported within a joint housing for universal pivotal movement on a plurality of elastic inserts which are prestressed so that the pivotal movement is absorbed by molecular deformation of the inserts.

The universal joint construction of the invention is particularly applicable for the suspension of swinging parts or pivotal parts of motor vehicles, such as, for example, axle suspensions or wheel guide suspensions. Such joints include a pivot pin having a ball head which is universally mounted within a housing of the joint.

In automotive engineering designs, joints are frequently used where the relative movements of the hinge parts are absorbed under friction contact by molecular deformation of the elastic inserts within the supporting housing. Such joints are free from smear and play and are insensitive to moisture, dirt, etc. They are also noise damping and particularly suitable for absorbing shock stresses.

The known embodiments of such joints have the disadvantage, however, that the elastic insert is overstressed when a large angular movement of the joint elements is required, and this easily leads to the destruction of the complete joint. In order to achieve a greater angular mobility of the joint, corresponding larger inserts are therefore required. A volume increase, however, leads as a rule to an undesired lability of the joint and this may have harmful effects on the steering and the guidance of the wheels of a vehicle when used in such applications. In order to improve the joints, it is known to form rubber elastic inserts of several layers, one within the other, and to vulcanize the layer successively. This is said to permit the use of rubber layers of different hardness in order to achieve a stepped stress of the elastic insert corresponding to the different degrees of hardness. A disadvantage of such a construction is that the materials with different properties are used for the production of the inserts and this means that they must be adapted to a total elasticity according to the anticipated stresses. Besides, several vulcanization operations are required, depending on the number of rubber layers, in order to achieve the desired adhesion between the various layers.

In accordance with the present invention there is provided a construction in which the hinge pin is supported for large angular movements without impairing its stability by the use of elastic insert support within the housing which are stressed in a particularly effective manner. With the inventive construction, a shell of a firm material, such as sheet metal, is provided between the elastic layers forming the total insert within the housing. Because of the interposition of the metal sheet between the elastic layers, the elastic layers can absorb the angular movement of the joints independently of each other so that an improvement in the joint operation and a greater improvement against wear is achieved.

Accordingly, it is an object of the invention to provide a universal joint construction including a housing having a plurality of elastic inserts therein for supporting the ball head of a pin member and wherein the elastic inserts are separated by a rigid material such as a sheet metal shell.

A further object of the invention is to provide a universal joint construction including a metal housing having an opening at each end, and a hinge pin extending through the opening of one end and having a ball head within the housing, and including a plurality of elastic insert members of generally spherical configuration prestressed to bear rigidly against each other and the ball head and separated by a shell of a rigid material such as sheet metal, and wherein the outer insert is prestressed by a cover closing the opposite end of the housing from the hinge pin.

A further object of the invetnion is to provide a universal joint construction which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Brief description of the drawings

The only drawing is a partial elevational and partial sectional view of a universal joint constructed in accordance with the invention.

Detailed description of the preferred embodiment

Referring to the drawing in particular, the invention embodied therein comprises a joint housing generally designated 1 in which a ball head 3 of a pivot or hinge pin is universally pivotally movable.

In accordance with the invention, the ball head 3 is supported on rubber elastic inserts 4 and 5 which are advantageously made of a plastic or a rubber material and which are inserted between the periphery of the ball head 3 and the interior of the joint housing 1. The inserts 4 and 5 are compressed so that they are under initial stress and there is frictional contact between the joint parts to support the universal pivotal mobility of the hinge pin 2 relative to the housing 1 by molecular deformation of the inserts 4 and 5.

In accordance with a feature of the invention, a shell 6 of a somewhat rigid material such as sheet metal is arranged between the inserts 4 and 5 in a manner such that the inserts can act successively and independently of each other.

The housing joint is closed at the side opposite from the hinge pin 3 by a flanged cover 7 which extends into he housing and exerts an initial stress on the outer elastic shell 4. The initial stressing of the inner shell 5 is effected by the sheet metal shell 6 which encloses the shell 5, preferably at equal distance from each end of the ball.

The inner periphery of said cover and the area within the housing about the opening at one end is shown to be stepped thus inherently providing a more positive interlock for the outer one of said inserts.

While a specific embodiment of the invention has been shown and described in detail to illustrate the application of the inventive principles, it will be understood that the invention may be embodied otherwise without departing from such principles.

What is claimed is:

1. A universal joint construction comprising a housing having an opening at one end, a hinge pin extending through the opening of said housing and having a ball head portion located within said housing, a plurality of prestressed unconnected elastic inserts disposed in radially spaced relationship around said ball head between said head and said housing and a shell of a firm material disposed between but not connected to said elastic inserts, said inserts being prestressed so that the movement of the hinge pin relative to the housing is absorbed by the molecular deformation of said inserts, said housing including and end opposite said hinge pin which is closed by a cover, said cover extending into said housing and bearing against the outer one of said inserts and prestressing said outer one of said inserts, and the inner periphery of said cover and the area within the housing about the said opening at one end being stepped thus inherently providing a more positive interlock for the outer one of said inserts.

2. A universal joint construction according to claim 1, wherein said inserts are of open-ended generally spherical configuration and are made of an elastic material such as rubber, said shell being of a sheet metal material.

References Cited

UNITED STATES PATENTS

| 1,868,818 | 7/1932 | Eksergian. |
| 1,990,016 | 2/1935 | Alden, et al. |
| 2,425,138 | 8/1947 | Venditty. |
| 2,855,232 | 10/1958 | Kozak. |

FOREIGN PATENTS

| 501,748 | 3/1939 | Great Britain. |

REINALDO P. MACHADO, Primary Examiner

A. V. KUNDRAT, Assistant Examiner

U.S. Cl. X.R.

287—85